US005510126A

United States Patent [19]

Van Eijk et al.

[11] Patent Number: 5,510,126
[45] Date of Patent: *Apr. 23, 1996

[54] TORTILLA

[75] Inventors: Johannes H. Van Eijk, King of Prussia; Merna Legel, Exton, both of Pa.

[73] Assignee: Gist-Brocades N.V., Netherlands

[*] Notice: The term of this patent shall not extend beyond the expiration date of Pat. No. 5,385,742.

[21] Appl. No.: 225,262

[22] Filed: Apr. 8, 1994

[51] Int. Cl.$^6$ .................................................. A21D 8/04
[52] U.S. Cl. .................................. 426/19; 426/20; 426/21; 426/22; 426/27; 426/62; 426/549
[58] Field of Search .............................. 426/62, 20, 21, 426/22, 27, 549

[56] References Cited

U.S. PATENT DOCUMENTS

| 3,653,915 | 4/1972 | Rubio | 426/549 |
|---|---|---|---|
| 3,655,385 | 4/1972 | Rubio | 426/549 |
| 3,709,696 | 1/1973 | Rubio | 426/549 |
| 4,604,289 | 8/1986 | Spanier | 426/62 |
| 4,735,811 | 4/1988 | Skarra | 426/549 |
| 4,781,932 | 11/1988 | Skarra | 426/549 |
| 4,806,376 | 2/1989 | Saeki et al. | 426/62 |
| 5,066,499 | 11/1991 | Arciszewski | 426/62 |
| 5,188,852 | 2/1993 | Origane et al. | 426/62 |
| 5,288,509 | 2/1994 | Potman | 426/62 |
| 5,385,742 | 1/1995 | Van Eijk | 426/62 |

OTHER PUBLICATIONS

Composition of Foods 1975 U S Agricultural Handbook No. 8, pp. 120–121.

*Primary Examiner*—Carolyn Paden
*Attorney, Agent, or Firm*—Bierman and Muserlian

[57] ABSTRACT

The quality of wheat flour tortillas is improved by using a yeast derivative in the tortilla dough.

12 Claims, No Drawings

TORTILLA

TECHNICAL FIELD

The present invention relates to a method for improving quality of wheat flour tortillas and tortillas produced by this method.

BACKGROUND OF THE INVENTION

Wheat flour tortillas are widely consumed in Mexico and are increasing in popularity in the United States and Europe. In the US the hot-press method is becoming the most popular method for producing wheat flour tortillas mainly because of its high efficiency and consumer preferences.

In general flour tortilla formulations contain four major ingredients: flour, water, salt and shortening/oil. However, other ingredients such as leavening agents, yeast, sugar, emulsifiers, preservatives, acidulants and gums (hydrocolloids) are commonly used to further improve quality (especially keeping quality) of wheat flour tortillas. Although some tortilla formulations rely on yeast instead of chemical leaveners for leavening the dough, yeast is added primarily as a flavouring agent. A fermentation flavor is produced by using up to 1% of active dry yeast or up to 3% of regular compressed yeast. An overview of the various methods for producing wheat flour tortillas and ingredients used is given by Serna-Saldivar et al (Cereal Foods World 33 (1988) 855–864).

A major problem in the production of wheat flour tortillas (especially when using the hot-press method) is that a resting period is required to relax the dough pieces before pressing them into round shaped tortilla. If the resting period is kept too short, the tortilla dough is difficult to press and will give tortillas of inferior quality upon baking. Reducing agents are commonly used to shorten resting times by increasing extensibility and decreasing elasticity of gluten protein. This is achieved with compounds such as L-cysteine, bisulfites, sorbic or fumaric acid which break of block gluten disulfide bonds thereby improving machinability of the tortilla dough. However, the use of these chemical components should be limited because at high dosages they tend to reduce shelf life stability (rollability over time) of wheat flour tortillas.

Proteases have been described as an alternative for chemical dough relaxing compounds in some baking applications. However, the use of this type of enzyme which remains active after mixing will greatly affect process tolerance making proteases less suitable as a dough relaxing agent in tortilla production. In addition, materials such as soy flour, wheat germ, garlic and inactivated dry yeast have been described as a useful source of low molecular weight SH compounds such as L-cysteine and/or glutathion. These materials have been described as a dough relaxing agent and mix time reducer in the production of various products from wheat flour. U.S. Pat. No. 4,643,900 describes the use of garlic as a dough relaxing agent in the production of baked goods such as bread, crackers, pizza and sweet goods. Japanese patent application J 61-009263-A describes the use of inactive dry yeast as a dough relaxing agent which improves extensibility and softness of noodle dough and shortens the process time for making noodles. EP-A-141754 describes a bread mix for preparing bread containing whole wheat flour, gluten and 0.1–0.2% of inactive dry yeast functioning as a mix-time reducer. EP-A-0262669 describes fat compositions suitable for use in bakeries and confectioners which contain, in addition to the fat component, disrupted yeast cells.

Fats play a very important role in the way a tortilla dough behaves during processing and greatly affect the quality of tortilla made from wheat flour. Wheat flour tortilla formulations generally contain between 5 and 15% (percentages based on flour weight) of plastic shortenings or liquid oils. These high levels of fat are essential in improving dough machinability and keeping quality (rollability over time). The use of emulsifiers in wheat flour tortilla production can reduce the amount of shortening needed in the tortilla formula. Normally 0.2–0.5% (based on flour weight) of an emulsifier with a good dough stabilising action such as SSL is used in tortilla formulations.

Gums such as (modified) starches, carboxymethyl cellulose, xanthan and arabic gums or mixtures thereof have found limited use for improving dough machinability and keeping quality (rollability) of wheat flour tortillas. These watersoluble hydrocolloids function as stabilisers and thickeners which bind large quantities of water and allow some reduction of the amount of fat in the tortilla formula. Partly solubilised cell walls from yeast have been described as thickeners and stabilisers having fat-like properties in U.S. Pat. Nos. 9,122,196 and 4,992,540. Reducing the amount of fat in tortillas is of considerable interest both to the tortilla manufacturers and to the consumer who wants to reduce calorie intake from fats. Despite the use of expensive gums and emulsifiers it is not possible yet to produce a tortilla of acceptable shelf life stability (rollability) and overall quality if no or only low levels of fat are used in the recipe.

SUMMARY OF THE INVENTION

The present invention provides an improvement of the quality of wheat flour tortillas by using a yeast derivative in the tortilla dough.

The present invention is primarily directed to the use of inactive dry yeast as an ingredient in the production of no-fat and low-fat wheat flour tortillas. The main advantage of using the ingredient described in the present invention is an improvement in the shelf life stability and overall quality of hot-press wheat flour tortillas. The use of the ingredient described in this invention allows a partial or total elimination of fat in a tortilla recipe whereas the quality of the low fat or no-fat tortilla will be equal or even better than what could be obtained when adding normal levels of fat. Additional benefits from the use of this ingredient in the production of wheat flour tortillas are an improved taste and flavor, a better dough machinability and a reduction of the resting time required before tortilla doughs can be pressed (hot press tortillas).

DETAILED DESCRIPTION OF THE INVENTION

The present invention relates to a method for improving overall quality of hot-press wheat flour tortillas, in particular low-fat and no-fat wheat flour tortillas, by addition of an improver composition containing a yeast derivative.

Advantageously the yeast derivative of the present invention can be produced by fermenting a selected yeast strain, preferably a Saccharomyces genus, and drying the liquid cream yeast and grinding it into a powder or it can be produced by controlled grinding of active or instant dry yeast and also by controlled drying combined to a controlled heat treatment. The yeast derivative is defined as a composition having a moisture content between 0 and 10%, a protein content in between 40 and 65% (N×6.25), an sulfhydryl referred to hereinafter as SH-content in between 2 and 150 micromole per gram and more preferably in between 10 and 100 micromole per gram (according to the method described by Ellman, Arch. Biochem. Biophys. 82 (1959), 70) and in general enzyme activities normally found in bakers yeast such as catalase, hexokinase, alcoholdehydrogenase, NADH-oxidase, cytochrome o peroxidase and proteinase. The gassing power of the yeast derivative is in between 0 and 100 ml $CO_2$ per hour and per gram at 30° C. Preferably the gassing power is less than 50 ml $CO_2$ per hour per gram at 30° C. The yeast derivative of the present invention is typically characterised by a residual gassing power (as compared to normal untreated yeast) of less than 20%, more preferably less than 10% whereas residual enzyme activities range between 0–100%.

The yeast derivative can be incorporated in an improver composition which may comprise other improving agents such as leavening agents, yeast, sugar, emulsifier, preservatives, acidulants and gums (hydrocolloids).

Preferably the improver composition comprises at least a yeast derivative, an emulsifier and a hydrocolloid. The yeast derivative can also be incorporated in an instant mixture which comprises all the tortilla ingredients viz. the ingredients mentioned above together with flour, salt and shortening/oil and to which only water has to be added to form the tortilla dough.

The tortilla dough is prepared by mixing flour, water, salt, shortening together with an effective amount of yeast derivative. Optionally other improving agents can be added.

Preferably the dough comprises 0.25 to 2%, more preferably 0.5 to 1% (based on flour) of yeast derivative.

In general 0–65 g of shortening, preferably 0–10 g of shortening (based on flour) will be used.

All publications and patent applications cited in this specification are herein incorporated by reference as if each individual publication or patent application were specifically and individually indicated to be incorporated.

DESCRIPTION OF THE SPECIFIC EMBODIMENTS

The present invention will be further demonstrated by the following examples. It should be noted that the present invention is by no means limited to these examples.

EXAMPLE 1

Preparation of the Yeast Derivative

A yeast derivative was obtained from instant dry yeast having a gassing power of 350 ml $CO_2$ gas per hour and per g at 30° C. and a catalase activity of 265 U/g. The yeast derivative was prepared by grinding the instant yeast in a small-scale coffee grinder and collecting the material passing through a 65 mesh sieve. The obtained product did not produce $CO_2$ (<20 ml $CO_2$ per hour per gram at 30° C.), had an SH-content of 23 micromole per gram and showed enzymatic activities, among others a catalase activity of 225 U/g. One unit of catalase activity is defined as the amount of enzyme which decomposes one micromole of hydrogenperoxide per minute at 25° C. and pH 7.5.

EXAMPLE 2

Preparation of Hot Press Wheat Flour Tortillas

Hot press wheat flour tortillas were prepared with a standard formula of 1.0 kg of hard white winter flour (100%), 500 g water (50%; optimal), 65 g plastic shortening (6.5% CRISCO™), 13 g salt (1.3% NaCl), 2 g SSL (0.2% EMPLEX™), 2 g (partly succinylated) monoglycerides (0.2% DOCONTROL™), 2.7 g fumaric acid (0.27%), 5 g SALP (0.5% Levn-Lite™), 6 g baking soda (0.6% $NaHCO_3$) and 4 g potassium sorbate (0.4%). The ingredients (except shortening) were dry blended for 2 minutes with a paddle in a HOBART™ model A-200 mixer. Dry blending was continued for 8 minutes after addition of shortening. Water of 35° C. was added and the mixture was mixed into a well developed dough of 30° C. (1 minute at speed 1 followed by 5 minutes at speed 2). Optimum water absorption was determined by the farinograph procedure (750 BU). After a bench time of 5 minutes at 32° C. the dough was divided by a divider/rounder (BESCO) into 36 dough balls of approximately 47 g each. Dough balls were relaxed in a proof box at 32° C./80% RH. Optimal resting times were determined by measuring the diameter of pressed unbaked tortillas. Tortilla dough was evaluated for dough machinability and required resting time before hot pressing. Tortillas were evaluated for pH, diameter, taste and flavor, moisture content, storage stability and translucency (scale 1 (best; few translucent areas) to 3 (worst; many translucent areas)). Storage stability was determined every other day by scoring rollability of tortillas stored at room temperature for up to 14 days. Rollability was assessed by wrapping a tortilla around a dowel of 1 cm diameter and rating the cracking and breaking of the tortilla. The rollability scale varied from 1) no cracking (best), 2) signs of cracking but no breaking, 3) cracking and breaking beginning on one surface, 4) cracking and breaking imminent on both sides, and 5) unrollable, breaks easily. The rollability scores over time of various tortilla formulations were compared by ranking.

Table I shows the results of a baking test for evaluating the effect of the yeast derivative prepared as described in EXAMPLE 1 and of L-cystein used a dough relaxer in hot press wheat flour tortillas. From the results in this Table it is concluded that the addition of the yeast derivative (1% based on flour weight) increases water absorption (app. 2 ml additional water per gram of yeast derivative), increases the moisture content of the tortilla, shortens the required resting time before pressing and increases tortilla diameter to a similar extent as L-cysteine (30 ppm), and improves overall tortilla quality, especially shelf life stability (rollability over time) and taste and flavor of wheat flour tortillas.

TABLE 1

| RECIPE | CONTROL | YEAST DERIVATIVE (1%) | L-CYSTEINE (30 PPM) |
| --- | --- | --- | --- |
| Opt. $H_2O$ Absorbance | 50% | 52% | 50% |
| Dough consistency | good smooth | excellent smooth | soft |
| Opt. resting time | 20 min | 7 min | 12 min |
| pH of tortilla | 6.02 | 5.99 | 6.08 |
| Moisture content | 29.5% | 30.4% | 29.6% |
| Translucency (Avg) | 1.5 | 1.0 | 1.5 |
| Avg diameter (mm) | 170 | 102 | 105 |
| Rollability score | middle 2 | best 1 | worst 3 |
| Ranking | | | |
| Taste & flavor | normal | improved (yeast-like) | normal |
| Overall quality Ranking | good 2 | excellent 1 | good 3 |

EXAMPLE 3

Preparation of Low-Fat and No-Fat Tortillas

Hot press wheat flour tortillas were prepared according to the procedure and standard recipe as described in EXAMPLE 2. The amount of shortening in the recipe was varied from 6.5% (normal) to 1.4% (low-fat) and to 0% (no-fat), whereas the amount of yeast derivative prepared as described in EXAMPLE 1 was varied between 0 and 1% (percentages based on 6.5% (normal) to 1.4% (low-fat) and to 0% (no-fat), whereas the amount of yeast derivative prepared as described in EXAMPLE 1 was varied between 0 and 1% (percentages based on flour weight). TABLE 2 summarises the variations in the basic recipe tested and shows the results of the baking test. Fat content of the various tortillas was calculated from the fat content (determined as fatty acids after hydrolysis) of the various ingredients in the recipes.

The results confirm that addition of the yeast derivative increases water absorption (app. 1 ml water per g of yeast derivative), shortens the required resting time, and improves overall tortilla quality by improving shelf life stability (rollability over time), translucency and taste and flavor. The amount of shortening in the standard recipe is critical for obtaining the desired tortilla quality. For a low fat claim the tortillas should contain less than 2 g of fat per 100 g tortilla (98% fat free) and therefore should be prepared by adding less than 1.4% of fat to the flour (percentage based on flour weight). The results in TABLE 2 show that low-fat (app. 2 g fat/100 g tortilla) and no-fat (app. 0.9 g fat/100 g tortilla) tortillas have unacceptable quality mainly because of limited shelf life stability and appearance (too many translucent areas). However, addition of the yeast additive improves overall tortilla quality (in particular shelf life stability and appearance) to such an extent that the overall quality of low-fat and no fat tortillas becomes superior or at least comparable to that of tortillas prepared with normal levels of fat (6.5% on flour weight). Thus the yeast derivative is useful for preparing low-fat and no-fat tortillas of high quality.

TABLE 2

|  |  | A Control | B | C | D | E | F |
|---|---|---|---|---|---|---|---|
| RECIPE |  |  |  |  |  |  |  |
| Flour | (g) | 1000 | 1000 | 1000 | 1000 | 1000 | 1000 |
| Water | (ml) | 500 | 520 | 525 | 510 | 530 | 535 |
| SSL (EMPLEX) | (g) | 2 | id | id | id | id | id |
| DoControl | (g) | 2 | id | id | id | id | id |
| SALP | (g) | 5 | id | id | id | id | id |
| Baking soda | (g) | 6 | id | id | id | id | id |
| Fumaric acid | (g) | 2.7 | id | id | id | id | id |
| Salt | (g) | 13 | id | id | id | id | id |
| K sorbate | (g) | 4 | id | id | id | id | id |
| Shortening | (g) | 65 (6.5%) | 14 (1.4%) | 0 (0%) | 65 (6.5%) | 14 (1.4%) | 0 (0%) |
| Yeast derivative | (g) | 0 (0%) | 0 (0%) | 0 (0%) | 10 (1%) | 10 (1%) | 10 (1%) |
| TEST RESULTS |  |  |  |  |  |  |  |
| Water absorption (% $H_2O$) |  | 50 | 52 | 32.5 | 51 | 53 | 53.5 |
| Dough consistency |  | good smooth | good smooth | good smooth | good smooth | good smooth | good smooth |
| Opt. resting time (min.) |  | 20 | 23 | 22 | 10 | 14 | 12 |
| pH of tortilla |  | 6.0 | 6.0 | 5.9 | 6.0 | 6.1 | 6.0 |
| Translucency (Avg) |  | 1.5 | 2.0 | 3.0 | 1.0 | 1.0 | 1.5 |
| Rollability score Ranking |  | 2 | 3 | 4 | best 1 | 2 | 2 |
| Taste & flavor |  | good | good | good | best | best | best |
| Overall Quality Ranking |  | 2 | 3 | 4 | best 1 | 1 | 2 |
| Fat content (calculated) (g/100 g tortilla) |  | 5.7 | 2.0 | 0.9 | 5.7 | 2.0 | 0.9 | id: same as control

We claim:

1. An improver composition for wheat flour tortillas comprising a yeast composition obtained by subjecting yeast to at least one step selected from the group consisting of drying, heating and grinding, said yeast having a moisture content between 0 and 10%, a protein between 40 and 65% (N×6.25), an SH-content between 2 and 150 micromoles per g and a gassing power of between 0 and 100 ml $CO_2$ per hour and per g at 30° C. and other normal tortilla ingredients.

2. An improver composition according to claim 1 which further comprises at least one component selected from the group of emulsifiers and hydrocolloids.

3. A wheat flour tortilla with reduced fat containing an effective amount of an improver composition of claim 1.

4. A method of shortening the required resting time in wheat flour tortilla production comprising incorporating into the tortilla dough before resting an amount of a yeast composition obtained by drying, heating or grinding yeast having a moisture content between 0 and 10%, a protein content between 40 and 65% (N×6.25), an SH-content between 2 and 150 micromoles per g and a gassing power of between 0 and 100 ml $CO_2$ per hour per g at 30° C., sufficient to shorten the resting time of the dough.

5. An improver composition of claim 1 wherein the protein content is between 50 and 60% (N×6.25), and the SH-content in between 10 and 100 micromoles per g.

6. A process for preparing a wheat flour tortilla dough which comprises mixing of flour, water, salt, shortening together with an effective amount of a yeast composition obtained by drying, heating or grinding yeast having a moisture content between 0 and 10%, a protein content between 40 and 65% (N×6.25), an SH-content between 2 and 150 micromoles per g and a gassing power of between 0 and 100 ml $CO_2$ per hour and per g at 30° C. for improving the quality of the dough.

7. A process for preparing a wheat flour tortilla dough according to claim 6 which comprises mixing of flour, water, salt, an effective amount of yeast derivative and shortening of flour.

8. The process of claim 7 wherein the amount of shortening is 0 to 65 g per kg of flour.

9. The process of claim 7 wherein the amount of shortening is 0 to 10 g per kg of flour.

10. A process for preparing a wheat flour tortilla which comprises preparing a dough according to the process of claim 6 and baking said dough into a tortilla.

11. Wheat flour tortilla obtainable by the process according to claim 10.

12. Wheat flour tortilla dough obtainable by the process according to claim 6.

* * * * *